Nov. 25, 1958   J. J. SMITH   2,861,835
LITTER RETRIEVING CANE
Filed June 20, 1955
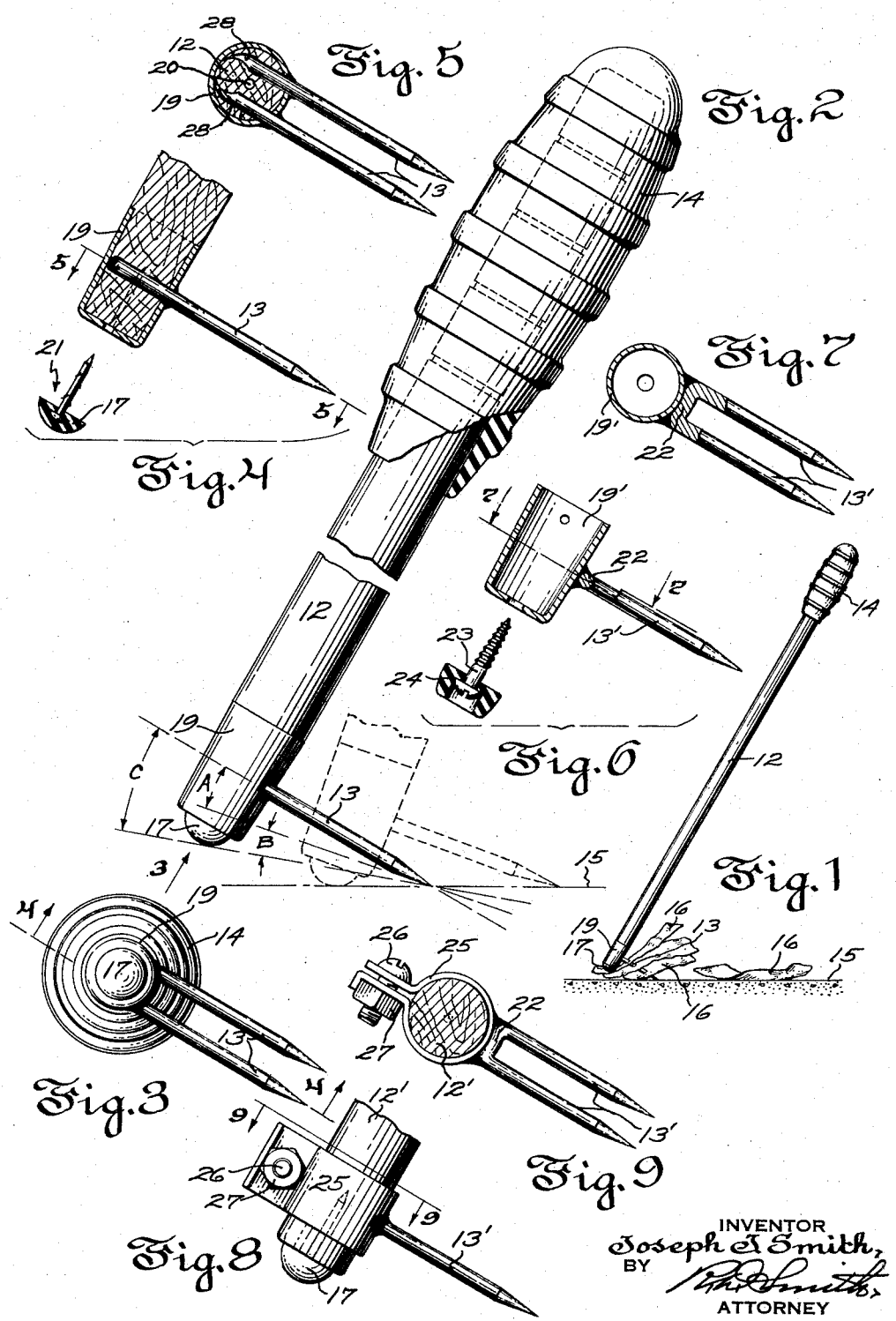
INVENTOR
Joseph J. Smith,
BY
ATTORNEY

United States Patent Office 2,861,835
Patented Nov. 25, 1958

2,861,835

LITTER RETRIEVING CANE

Joseph J. Smith, Bridgeport, Conn.

Application June 20, 1955, Serial No. 516,697

1 Claim. (Cl. 294—19)

This invention relates to implements in the nature of canes for picking up from the ground and depositing in a trash receptacle pieces of trash and litter such as paper scraps, leaves, twigs, cigarette stubs and a great variety of small solids or larger thin-walled hollow articles, without stooping or exercising skill in manipulating the implement. The improvements also pertain to means making it easy to convert a conventional cane into a retrieving implement having the said advantages.

Stick-like implements as heretofore proposed for picking up or retrieving litter from ground surfaces have incorporated complicated clamp-like devices actuated through manually operated mechanism extending from the handle end of the stick to the ground end of the stick for clutching the article that is to be reached and picked up from the ground. Former proposals for eliminating the complication of such mechanisms have deprived the stick of its use as a cane because making use of parts that project usually in an axial direction from the bottom end of the stick. Parts so placed intervene between the ground and the ground reaching end of the stick. This precludes practical use of the stick as a walking cane when needed for steadying the movements of a crippled or aged person who otherwise might be employed as grounds clean-up man. Also, pick-up sticks or cane-like retrievers as heretofore proposed have been unable effectively to engage certain kinds of litter articles in a manner to pick them up readily and with certainty as for instance solid articles or hollow articles of material too hard to be pierced but which require a clinging or shoveling action of the implement in order to be successfully engaged and balanced and conveniently discharged into a litter receptacle.

An object of this invention is to overcome the shortcomings of formerly proposed cane retrievers by equipping a walking stick with litter retrieving means involving no relatively movable parts or mechanism and so arranged as to leave the bottom end of the cane clear of incumbrance for making anti-slipping contact with the ground while enabling the cane to be used for retrieving a wide variety of litter articles by lifting them from the ground and depositing them in a trash collecting receptacle by maneuvering the cane without having to bend or stoop.

Another object is to provide a litter retriever that will pick up trash and litter, such as scrap paper, from a hard or paved ground surface as well as from turf or soft ground surfaces.

Another object is to provide a litter retriever that can lift from the ground articles that are not susceptible to being pierced or speared as a way of making them cling temporarily to the pick-up equipment of a cane. Examples of such articles are beer cans, soda bottles, scraps of sheet metal, etc.

Another object is to equip a cane with litter engaging sharp-pointed prongs so spaced apart and so positioned and directed in relation to the ground contacting end of the cane that they do not impede the use of the cane as a walking stick nor become damaged by use of the cane as such, and yet so arranged that they can straddle the edge of thin articles and balance them by restraining the article from turning while being lifted.

A still further object of the invention is to arrange the retrieving prongs so as to be self sharpening if scraped against a cement walk or other paved ground surface in the natural way of swinging the cane to cause the prongs or spurs to spear the litter to be retrieved.

A still further object is to arrange the prongs to constitute a very strongly magnetized horseshoe magnet for attracting articles of ferrous metal that could not otherwise be successfully engaged and discharged into a trash receptacle.

These and other objects of the invention will become apparent from the following description of preferred embodiments of the improvements chosen for illustrative purposes only and in no way limiting of the scope of the appended claim to the invention. The description has reference to the appended drawings wherein:

Fig. 1 shows a cane or combined walking stick and retriever incorporating the present invention and indicates its manner of use for spearing and retrieving pierceable litter such as scraps of paper from a hard ground surface or pavement.

Fig. 2 is a view in contracted length showing my improved retriever cane on a scale slightly larger than preferred actual size.

Fig. 3 is an end view of the retriever cane looking at Fig. 2 in the axial direction of arrow 3.

Fig. 4 is a view taken in section on the plane 4—4 in Fig. 3 showing the anti-slip foot button detached from the end of the cane.

Fig. 5 is a view taken in section on the plane 5—5 in Fig. 4 looking in the direction of the arrows.

Fig. 6 shows a modified construction of the prongs and of a ferrule that armors and is separable from the end of the cane wherefore to serve as a fitting that can be merchandised separately from the cane to be attached to any walking stick.

Fig. 7 is a view taken in section on the planes 7—7 in Fig. 6 looking in the direction of the arrows.

Fig. 8 shows a modified form of prong supporting attachment in the nature of a screw tightened clamp adapted to encompass the end portion of a cane in adjustable position lengthwise thereof.

Fig. 9 is a view taken in section on the plane 9—9 in Fig. 8 looking in the direction of the arrows.

While the drawings show the pick-up end of my improved retriever stick or cane 12 equipped with two side-by-side laterally spaced apart prongs or spurs 13 that are parallel, it will be clear that the underlying principles of my invention may be embodied in constructions employing spurs that are not parallel throughout their length nor exactly at right angles to the longitudinal axis of the stick, as well as in constructions employing prongs that are spaced farther apart or less far apart than is indicated in the drawings hereof.

What matters is that the sharp-pointed ends of the spurs shall have an angle of taper that bears a proper relationship to such other factors of arrangement as the relationship of the length of the spurs to their distance from the ground contacting end of the cane. I have discovered that in such proper relationship the natural arm and wrist movement of the user when grasping the handle 14 of the cane will cause the spurs 13 to sweep in an arc capable of spearing loose pierceable pieces of litter 16 despite an inability to penetrate also the hard ground surface or pavement 15. Spurs proportioned and related as herein shown can readily pierce scraps of paper 16 even though the paper is hard or stiff and lying flat on a hard or paved ground surface. This performance would be difficult if not impossible if the spearing agent were a spike projecting axially out of the extreme end of the cane as has heretofore been proposed. If the prongs 13, or either of them, were to be mounted on the cane in a way which encumbered contacting of the ground by the bottom end of the stick, the stick would be deprived of practical use as a cane.

I have therefore devised ways and means for anchoring the spurs to the stick in a relationship that leaves bare and unencumbered the ground contacting end of the stick. The end of the stick carries a foot button 17 of rubber or other suitable anti-slip non metallic material capable of gripping against the ground to assist in walking.

The preferred positional relation of the piercing point of the prongs 13 in relation to the ground gripping end button 17 of rubber or other non slipping material is such that when the cane is swung at arms length by grasping its handle 14 the point of the prongs will sweep in an arc that increasingly approaches tangency to the ground surface as the cane nears a vertical position as shown in Figs. 1 and 2. Said arc is preferably such that the ground engaging end 17 of the stick or cane 12 shall not reach the ground surface before the stick nearly reaches a vertical position in its sweeping movement. Under these conditions if the sharp-pointed ends of the spurs contact and scrape along a hard ground surface such as indicated by the pavement or cement surface 15, it will serve to hone the points in a manner to maintain their pointed sharpness instead of blunting the spur points as would occur if pieces of litter had to be speared as by movement of the cane in an endwise direction.

The several figures of the drawings show different constructions for mounting the prongs 13 in preferred position near the end of the cane.

In Figs. 1 to 5 inclusive the bottom end of the shaft 12 of the cane, which may be a straight stick of suitably hard wood or a hollow tube with or without a wooden plug filling the ground end of the tube such as the ground end of stick 12 fills the ferrule 19, about a yard long. If of wood, the cane shaft is armored by a cup-shaped ferrule 19 having a hole 20 through which the barbed shank of the rubber headed tack 17 can pass when driven into the end of the wooden stick. This will assist in holding ferrule 19 on the end of the cane although the ferrule if given a sufficiently tight tapering drive fit on the end of the stick will not require the tack 17.

The side wall of the ferrule has two adjacent holes through which there is inserted, crosswise of the cane with a tight press fit, each of the two prongs 13. The internal ends of these prongs are tapered and clinched against the internal surface of the wall of ferrule 19 as shown in Fig. 5 to prevent their withdrawal or may be welded to the ferrule where they pass through the ferrule wall. These prongs are thereby fixedly lodged in the cane so as to serve as spurs having sufficient firmness to withstand striking a glancing or scraping blow against a hard ground surface in the described manner of use of the cane without thereby becoming loose in the stick 12.

Figs. 6 and 7 show a thimble-shaped ferrule 19' to the external curved surface of which there is welded the bridge portion 22 of a U-shaped piece of somewhat springy wire whose legs form prongs 13' relatively positioned and spaced like prongs 13 but not requiring the wood of the walking stick to be penetrated by the prong forming wire. I prefer to secure the ferrule 19' to the stick with the aid of an ordinary wood screw 23 whose head is sunk in a recess in the rubber cup washer 24 providing an anti-slip ground contacting end for the cane. Such an article as is shown in Figs. 6 and 7 can be merchandised without the walking stick for application thereto by the purchaser.

In Figs. 8 and 9 there is substituted for the ferrule 19 or 19' an ordinary hose clamp 25 comprising a flexible metallic strap wrapped about the stick or cane 12' and whose parallelly disposed free ends are drawn tightly together by a machine screw 26 and nut 27 so as to clamp the member 25 fixedly against the stick 12' at selective distances from the end button 17 of the cane. The U-shaped wire 13' is welded to the external surface of clamping strap 25 as it is to the ferrule 19' of Figs. 6 and 7.

By use of this form of spur anchorage the relationship of the pointed end of the prongs 13' to the end 17 of the cane can be varied to suit different arcs of swing of the litter piercing end of canes of differing length for use by persons of differing height.

I have discovered that an effective ratio of length of spur to distance of spur from the ground end of the walking stick is two to one. The spur length should not be less than the spur distance from cane end. Spurs whose lengths are much more than twice their distance from cane end are less wieldy and more difficult to steer into proper piercing relation to the litter that is to be picked up. To suit the above ratios in positional relationship I prefer to sharpen the pointed ends of the spurs at an included angle of 15 degrees. One-half of this included angle is indicated as angle A in Fig. 2. It can to advantage about equal the angle B made by the axis of the spur with a line touching the cane end 17 intersecting the spur axis at the point of the spur. Within the suggested range of spur length to distance of displacement from end of stick the angle C may be 15 degrees. In these relationships it will be noted that the spurs point in a direction more nearly perpendicular to than parallel with the length of the cane. These relationships are met by making the spurs about 2⅜" long at a distance axially of the stick of about ½" from the end of the stick. The prongs 13 or 13' can to advantage be made of stainless steel wire about 9/32" in diameter.

I have found that spacing the spurs apart a distance of approximately ¼" is well adapted to picking up cigarette butts and to balancing picked-up articles by straddling the edges thereof such as the lips of empty tin cans, flat sheets of scrap material etc.

The appended claim is directed to and intended to cover all variations and equivalents for the exact constructions herein disclosed which would be obvious substitutes therefor and which are included within a broad interpretation of the recital of the claim.

I claim:

A litter retrieving cane comprising, a cane shaft whose length extends between a handle end and a ground contacting end of the cane, and two sharp-pointed straight parallel spurs projecting laterally from the same side of said shaft at a distance of approximately one half inch from said ground contacting end of the cane and at equal longitudinal distance from said end of the cane, said spurs projecting from said shaft approximately one and three quarters inches and having their axes spaced apart approximately one quarter of an inch whereby to leave said ground contacting end of the shaft free from interference by said spurs in swinging placement of said shaft end on the ground to support the user in walking, the axes of said spurs occupying a common plane that is substantially perpendicular to the length of the shaft.

References Cited in the file of this patent
UNITED STATES PATENTS

| | | |
|---|---|---|
| 531,384 | Olson | Dec. 25, 1894 |
| 777,391 | Abraham | Dec. 13, 1904 |
| 2,266,657 | Rivers | Dec. 16, 1941 |
| 2,281,501 | Jenkins | Apr. 28, 1942 |
| 2,322,164 | Scudder | June 15, 1943 |
| 2,367,105 | Donaldson | Jan. 9, 1945 |
| 2,388,374 | Tracy | Nov. 6, 1945 |
| 2,597,400 | Stogsdill et al. | May 20, 1952 |
| 2,603,521 | Taylor et al. | July 15, 1952 |
| 2,690,617 | Giern et al. | Oct. 5, 1954 |

FOREIGN PATENTS

| | | |
|---|---|---|
| 14,038 1909 | Great Britain | Apr. 28, 1910 |